Dec. 11, 1956 — W. G. SYLVESTER — 2,773,602
FILTER APPARATUS
Filed Feb. 2, 1953
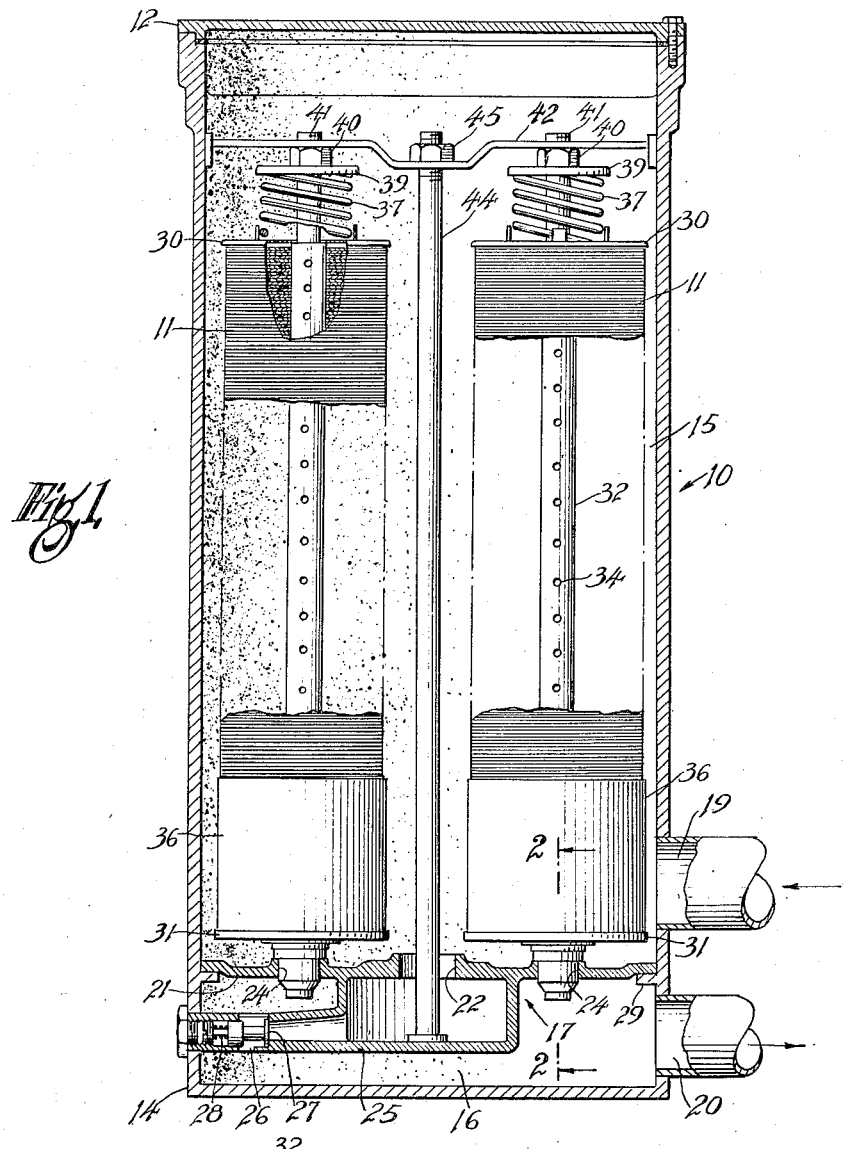
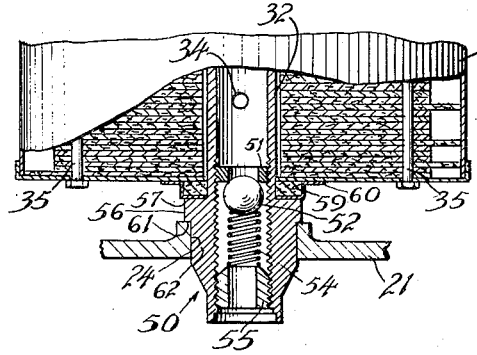
INVENTOR.
Walter G. Sylvester
BY
J. William Carson
ATTORNEY United States Patent Office 2,773,602
Patented Dec. 11, 1956

2,773,602

FILTER APPARATUS

Walter G. Sylvester, West Caldwell, N. J., assignor to Specialties Development Corporation, Belleville, N. J., a corporation of New Jersey Application February 2, 1953, Serial No. 334,511

3 Claims. (Cl. 210—166)

The present invention relates to liquid filtration, and, more particularly, to an improved apparatus for filtering engine lubricating oils or the like.

It is presently generally accepted in industry that one limiting factor, in determining when periodic engine maintenance and inspection are required, is the effectiveness of oil filtration. As lubricating oil is circulated through an engine, during operation thereof, abrasive particles of dirt, particles which are the products of oil decomposition or combustion, and metallic bearing particles are continuously deposited therein. These particles, if not filtered out of the oil, cause considerable contamination or deposit buildup resulting in reduction of over-all engine efficiency, excessive bearing wear and ultimate destruction of the engine parts. Frequent inspections, involving costly engine shut downs, are therefore required in order to maintain the lubrication system in good order.

Consequently, improved filter efficiency will result in reduced maintenance, decreased engine shut down time, substantial improvement in engine economy, and less frequent replacement of oil filters.

Many commercial filter elements consist of material which is compressible to some extent wherefore the pressure of the liquid to be filtered causes compression or shrinkage thereof in proportion to the pressure differential across the particular material. This results in some reduction of the volume of dirt removed, but principally in a decrease in the size of the passageways or capillaries in the material through which the liquid must pass. A decrease in the latter results in an exponential decrease in the flow, which result materially offsets the linear relationship between pressure drop and flow. In order to improve the operating characteristics of such elements, it has been found desirable to reduce the pressure drop between the filter inlet and outlet, or across the filter material, wherefore compression of the filter material and decrease in the size of the capillaries is reduced.

Accordingly, an object of the present invention is to provide such a device which will create a back pressure of a predetermined value in a filter unit whereby the pressure drop through, and therefore the compression of, the filter material may be reduced.

Another object is to provide such a device which may be adjusted so that different values of back pressure may be employed.

Another object is to provide such a device which is simple, economical to manufacture, and practical in operation, and which will increase the filtration capacity of the filtering material or elements.

Another object is to provide a filter pack assembly unit which is adapted to be embodied in existing apparatus to improve the operation thereof.

Another object is to provide such a device which will increase the efficiency of oil filters.

A further object is to provide such a device which will safely permit less frequent maintenance and inspection shut downs.

Other and further objects of the invention will be obvious upon an understanding of the illustrative embodiment about to be described, or will be indicated in the appended claims, and various advantages not referred to herein will occur to one skilled in the art upon employment of the invention in practice.

In accordance with the invention, the foregoing objects are generally accomplished by providing filter apparatus comprising in combination a casing having an inlet for admitting liquid to be filtered which is under pressure and having an outlet for the filtered liquid, filter means mounted in the casing including a passage for receiving filtered liquid and communicating with the casing outlet, and normally closed pressure operable valve means in the passage adapted to be opened by the liquid under pressure to thereby regulate the pressure drop of the liquid passing through the filter means. The pressure operable means may consist of a normally closed valve located in the filtered liquid conducting passage which is adapted to open when the pressure of the filtered liquid reaches a certain value. For flexibility of use, the force required by the filtered liquid to open the valve may be varied by adjusting the force which normally retains the valve in a closed position.

A preferred embodiment of the invention has been chosen for purposes of illustration and description, and is shown in the accompanying drawing, forming a part of the specification, wherein:

Fig. 1 is a sectional view taken substantially through the longitudinal axis of filter apparatus embodying the present invention.

Fig. 2 is a fragmentary sectional view taken along the line 2—2 on Fig. 1, illustrating the valve means.

Referring to the drawing in detail, and more particularly to Fig. 1 thereof, an oil filter apparatus is shown which generally comprises an upright cylindrical casing or housing 10, and a plurality of filter elements or filter medium packs 11 mounted in the casing in the manner described hereinafter. The apparatus shown herein is equipped with four such filter packs, although it will be understood that the present invention can be practiced with apparatus utilizing one or any other suitable number of such filter packs.

The casing 10 has an open upper end, adapted to be closed by a cover 12, and has a closed lower end 14. The casing is divided into upper and lower chamber sections 15 and 16 by partition means 17 about to be described in detail. The upper chamber section is provided with an oil inlet 19, and the lower chamber section is provided with an oil outlet 20.

The partition means 17 comprises a circular shelf 21 having a central aperture 22 and having a plurality of apertures 24 corresponding in number to the number of filter packs which are spaced circumferentially and are located between the aperture 22 and the outer periphery of the shelf 21; a by-pass housing 25 at the underside of the shelf provided with an inlet by the aperture 22 in communication with the upper chamber section 15 and provided with an outlet 26 in communication with the lower chamber section 16; and a by-pass valve member 27 for controlling the flow of oil through the outlet 26 which normally is retained on its seat by an adjustable spring 28. The shelf 21 is supported by and is secured to an annular ledge 29 on the inner wall of the casing 10 spaced adjacently from the lower end 14 thereof.

The filter packs or units may comprise filter means such as a stack of edge type filter discs such as shown in United States Patent No. 2,582,272, for example; an upper end plate 30; a lower end plate 31; a central tube 32 on which the discs and end plates are mounted having a series of spaced perforations 34 in the zone of the stack of discs; and rods 35 connected to the end plates for assisting in aligning the filter discs. A tubular shield 36 surrounds the lower portion of each stack or at least the stack or stacks most closely adjacent the oil inlet 19 to prevent erosion of the discs by the flow of oil entering the casing.

The discs of the stack are held together under compression by a spring 37 mounted between the upper end plate 30 and a pressure disc 39 which abuts a nut 40 screw threaded on the upper end of a stud 41 having its lower end threaded into or otherwise secured to the upper end of the tube 32 to close to same. The compression force exerted by the spring on the filter discs may be varied by adjusting the position of the nut 40 on the stud 41.

The filter packs 11 are mounted in the casing 10 by positioning the lower end portions of the tubes 32 respectively in the apertures 24 of the shelf 21, and positioning the upper ends of the studs 41 in apertures of the arms of a spider 42. The spider also is provided with a central aperture for receiving the upper end of an upright rod 44 having its lower end secured to the bottom of the by-pass housing, and a nut 45 is threaded to the upper end of the rod 44 to hold down the spider whereby the filter packs are restrained against movement in the casing when so mounted.

The apparatus, as so far described, is more or less conventional and operates in the customary manner. Dirty oil under pressure enters the upper chamber section 15 by way of the inlet 19, passes through the filter packs, is received by the tubes 32 through their perforations 34, flows freely into the lower chamber section 16, and is discharged by way of the outlet 20. Should a higher than a permissible pressure build up in the upper chamber section, the by-pass valve member 27 functions to by-pass unfiltered oil to the lower chamber section, whereby the pressure in the upper chamber section is relieved.

In accordance with the invention, the filtered oil is prevented from flowing freely into the lower chamber section 16 to thereby create a back pressure in the filter packs or the like. As shown in Fig. 2, this is accomplished by providing a valve 50 at the lower end of the tubes 32. In the illustrative embodiment, the valve 50 comprises a ported seat member or ring 51 screw threaded into the tube 32, a valve member or ball 52 for the seat, a light spring 54 for urging the ball on its seat, and a spring retainer or collar 55 screw threaded into the tube 32. The force exerted by the spring 54 can be adjusted by varying the position of its retaining plug, whereby the pressure required to unseat ball 52 can be adjustably predetermined.

Preferably, the lower end of the tube 32 is formed with an enlargement or head 56 comprising an upper annular horizontal shoulder 57 for supporting an annular gasket 59 mounted in housing 60, a lower annular horizontal shoulder 61 which rests on the portion of the shelf surrounding an aperture 24, and a cylindrical section 62 below the shoulder 61 which fits snugly into the aperture 24. When the filter pack is mounted in the casing in the manner heretofore described, the lower plate 31 thereof bears against the gasket 59 to form a pressure tight seal between the lower end of the filter pack and the tube 32 whereby oil passing through the filter discs must leave the tube by way of the valve and oil in the upper chamber section 15 cannot enter the lower chamber section by way of the aperture 24.

In operation, the oil to be filtered is pumped into the casing 10 through the inlet 19, fills the by-pass housing 25 and the upper chamber section 15 of the casing, passes through the filter medium or elements which surround the tube 32, and enters the tube 32 through the perforations 34 where its further passage is prevented by the closed back pressure valve 50. As pumping of the oil into the casing continues, the pressure thereof builds up until it reaches a value sufficient to overcome the force exerted by the spring 54 against the ball 52 whereupon the ball is unseated to open the valve 50.

The filtered oil then enters the lower chamber section 16 and is discharged through outlet 20. During the flow of oil through the casing, the spring 54 causes a back pressure to be exerted in the fluid relative to the pressure of the incoming fluid. The result of these opposite pressures is a net reduction in the pressure drop through the filter medium or pack.

The by-pass valve 27 is preferably set to open at a pressure which is lower than that at which the oil is pumped into the casing 10 when the engine is operating at full load and top speed, while the back pressure valve is set to open at a pressure somewhat less than that at which the by-pass valve is set to open. In this manner, substantially continuous flow during engine operation is assured and oil is prevented from remaining in the casing long enough to cool sufficiently to become too viscous to pass through the filter packs.

Although the introduction of a back pressure acts to reduce the rate of fluid flow while the filter is new and the oil is clean, it has been found that when the oil and filter begin to get dirty, which occurs under normal operating conditions, reducing the pressure drop in the casing by creating a back pressure of a predetermined value therein, improves the rate of flow of oil through the filter, because, while the rate of flow is directly proportional to the pressure drop, it is also exponentially directly proportional to the diameter of the capillaries in the filter medium through which the oil must pass, or, in the case of edge type filter elements, is similarly proportional to the spaces in the pack through which the oil must pass. Since the filter elements or other media are compressed in proportion to the pressure in the casing, a reduced pressure results in larger capillaries through which the oil may flow wherefore a high rate of flow is maintained.

In conventional filter apparatus, the pressure of the incoming dirty oil tends to widen the capillaries of the filter medium, or, to separate the discs of edge type filter packs at the high pressure side of the filter disc stack while at the same time the end thrust exerted at each end of the filter unit by the incoming oil pressure tends to compress the same so that the area of the capillaries, or the space between the discs diminishes as the oil pressure drops from the incoming pressure towards zero across the filter unit. The introduction of a suitable back pressure device minimizes the effect of the end thrust and decreases the degree of compression of the capillaries, or discs, at the low pressure clean oil side of the filter unit thereby permitting a greater rate of flow therethrough.

Compression of the filter medium or discs by end thrust due to the incoming oil pressure, also reduces the volume in which a cake-like layer of solid dirt particles may form. Therefore, by properly regulating the pressure drop in the casing to reduce the degree of compression, the cake volume remains larger and the overall life of the filter unit is prolonged.

Both laboratory and field tests have indicated that, under normal dirt conditions, a back pressure of 10 p. s. i. applied to filter apparatus wherein the pressure of the incoming oil was 20 p. s. i. substantially doubled the rate of flow of oil through the filter over and above the rate of flow of oil under similar conditions in identical apparatus but with no back pressure device. The addition of a back pressure device to conventional filter apparatus also increased the dirt removal efficiency from between 85 to 90% to between 90 to 95% and substantially doubled the life of the filter pack. The pressure drop in the casing may be readily regulated by adjusting the seat ring 51 and/or the spring retainer plug 55, with respect to each other, to suitably load the spring so that the desired back pressure will be created in the casing.

From the foregoing description, it will be seen that the present invention provides an improved filter apparatus having means for controlling the pressure drop which increases the capacity and efficiency of the filter medium and effects reduction in maintenance and inspection shut downs. At the same time, the overall life of the filter medium and the rate of flow of oil therethrough are materially increased. Since the back pressure device may be associated with the perforated tube of the filter pack as a unitary assembly, the present invention can be readily embodied in existing filter apparatus by inserting this assembly.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

I claim:

1. In filter apparatus of the class described, a casing; a partition in said casing dividing said casing into upper and lower chambers, said upper chamber having an unrestricted inlet and said lower chamber having an unrestricted outlet and said partition having an aperture therein and a by-pass passageway for establishing flow communication between said upper and lower chambers, a stack of apertured, edge-type filter discs in said upper chamber; a tube extending through the apertures of said filter discs, said tube having a closed upper end, perforations adjacent said discs for receiving filtered liquid passing therethrough and an open lower end extending into said partition aperture for delivering the filtered liquid to said lower chamber; a downwardly facing valve seat in said tube adjacently spaced from its open lower end and located below the perforations thereof; a valve member for said seat; yieldable means for urging said valve member on its seat to normally resist delivery of filtered liquid from the open lower end of said tube to said lower chamber and thereby create a back pressure in said filter stack which serves to improve the rate of flow of liquid through said filter discs when the same have become contaminated with dirt particles and tend to resist the flow of liquid therebetween; and a normally closed check valve in said passageway adapted to be opened by the pressure of the liquid in said upper chamber in response to a pressure greater than that required to unseat said valve member.

2. Filter apparatus according to claim 1, wherein said yieldable means include a compression spring and a collar screw threaded into said tube for supporting the lower end of said spring and adjusting the degree of compression thereof.

3. Filter apparatus according to claim 1, including a plurality of said filter stacks and said tubes therefor provided with back pressure valving, and wherein said partition has a plurality of apertures each having the lower of one of said tubes therein, whereby said passageway serves as a common by-pass means for all of said tubes and the back pressure in each of said tubes is controlled independently.

References Cited in the file of this patent

UNITED STATES PATENTS

| 1,076,128 | Kupferle | Oct. 21, 1913 |
| 1,955,903 | Cammen | Apr. 24, 1934 |
| 2,108,798 | Dalrymple | Feb. 22, 1938 |
| 2,359,475 | Gauther | Oct. 3, 1944 |
| 2,480,108 | Barker | Aug. 30, 1949 |
| 2,507,125 | Townsend | May 9, 1950 |
| 2,598,131 | O'Donnell | May 27, 1952 |

FOREIGN PATENTS

| 656,494 | Great Britain | Aug. 22, 1951 |